United States Patent
Benosman (10) Patent No.: US 9,875,217 B2
(45) Date of Patent: Jan. 23, 2018

(54) SEMI-ACTIVE FEEDBACK CONTROL OF SWAY OF CABLES IN ELEVATOR SYSTEM

(71) Applicant: Mitsubishi Electric Research Laboratories, Inc., Cambridge, MA (US)

(72) Inventor: Mouhacine Benosman, Boston, MA (US)

(73) Assignee: Mitsubishi Electric Research Laboratories, Inc., Cabmbridge, MA (US)

( * ) Notice: Subject to any disclaimer, the term of this patent is extended or adjusted under 35 U.S.C. 154(b) by 497 days.

(21) Appl. No.: 14/658,607

(22) Filed: Mar. 16, 2015

(65) Prior Publication Data

US 2016/0272463 A1  Sep. 22, 2016

(51) Int. Cl.
  *B66B 3/00* (2006.01)
  *G06F 17/16* (2006.01)
  *B66B 5/00* (2006.01)
  *B66B 7/06* (2006.01)

(52) U.S. Cl.
  CPC .......... *G06F 17/16* (2013.01); *B66B 5/0018* (2013.01); *B66B 7/06* (2013.01)

(58) Field of Classification Search
  CPC .......... G06F 17/16; B66B 5/0018; B66B 7/06
  USPC ...................................................... 187/393
  See application file for complete search history.

(56) References Cited

U.S. PATENT DOCUMENTS

| 9,038,783 B2 * | 5/2015 | Roberts ................ B66B 7/068 187/391 |
| 9,067,761 B2 * | 6/2015 | Ropponen .............. B66B 7/06 |
| 9,327,942 B2 * | 5/2016 | Fukui .................. B66B 5/0031 |
| 9,359,172 B2 * | 6/2016 | Mangini ................ B66B 7/06 |
| 2006/0266591 A1 * | 11/2006 | Zhu .......................... B66B 7/06 187/411 |
| 2013/0173206 A1 * | 7/2013 | Benosman ............... B66B 7/06 702/141 |
| 2013/0275081 A1 * | 10/2013 | Benosman ............... B66B 7/06 702/150 |
| 2014/0069747 A1 * | 3/2014 | Benosman ............... B66B 7/06 187/414 |
| 2014/0124300 A1 * | 5/2014 | Benosman ............... B66B 7/06 187/247 |
| 2015/0008075 A1 * | 1/2015 | Benosman ............... B66B 7/06 187/247 |
| 2015/0027814 A1 * | 1/2015 | Benosman ............... B66B 7/06 187/247 |

FOREIGN PATENT DOCUMENTS

JP  2033078 A   12/2014
JP  2106586 A2  12/2014

* cited by examiner

*Primary Examiner* — Jeffrey Donels
(74) *Attorney, Agent, or Firm* — Gene Vinokur; James McAleenan; Hironori Tsukamoto (57) ABSTRACT

A method controls an operation of an elevator system including an elevator car moving within an elevator shaft and at least one elevator cable connected to the elevator car and the elevator shaft. The method determines, during the operation of the elevator system, a velocity of a sway of the elevator cable and modifies, in response to the determining, a damping coefficient of a semi-active damper actuator connected to the elevator cable according to a function of the velocity of the sway.

18 Claims, 8 Drawing Sheets

SEMI-ACTIVE FEEDBACK CONTROL OF SWAY OF CABLES IN ELEVATOR SYSTEM

FIELD OF THE INVENTION

This invention relates generally to elevator systems, and more particularly to reducing a sway of electrical cables in an elevator system.

BACKGROUND OF THE INVENTION

Typical elevator systems include an elevator car, e.g., for moving passengers between different floors of a building and a counterweight moving along guiderails in a vertical elevator shaft above or below ground. The car and the counterweight are connected to each other by hoist cables. The hoist cables are wrapped around a grooved sheave located in a machine room at the top or bottom of the elevator shaft. The sheave can be moved by an electrical motor, or the counterweight can be powered by a linear motor. Furthermore, the car receives control signals and power signals through a set of electrical cables which have one side attached to the bottom of the elevator car and the opposite side attached to the elevator shaft usually at the mid distance between the top and the bottom of the car.

The sway of the cables refers to an oscillation of the elevator cables, e.g., electrical cables, in the elevator shaft. The oscillation can be a significant problem in an elevator system. The oscillation can be caused, for example, by wind induced building deflection and/or the vibration of the cables during operation of the elevator system. If the frequency of the vibrations approaches or enters a natural harmonic of the cables, then the oscillations can be greater than the displacements. In such situations, the cables can tangle with other equipment in the elevator shaft or get structurally weaker over time, and the elevator system may be damaged.

Various conventional methods control the sway of the elevator cables. For example, in the method described in Japan Patent JP2033078A, a passive damping mechanical system is connects the elevator cable with elevator shaft. The passive mechanical system reduces the motion and vibration of the cable. Similarly, in the Japan Patent JP2106586A, two passive mechanical systems are added to the elevator cable to damp out its vibrations. One roller-like mechanical system is mounted at the point of connection between the elevator cable and the elevator shaft with a motion of the rollers along the elevator shaft wall, i.e., perpendicular to the vibration of the elevator cable.

Another similar passive mechanical system uses a roller-like device forcing the cables to move in the axis of vibrations of the elevator cables. However, the passive damping systems are configured in advanced preventing the adjustment of the damping system for any changes in the state of the elevator system.

Accordingly, there is a need for another method to reduce the sway of the elevator cables.

SUMMARY OF THE INVENTION

It is an objective of some embodiments of an invention to provide a system and a method for reducing a sway of an elevator cable connected to an elevator car in an elevator system by applying damping forces to the cables. For example, one embodiment of the present invention uses a semi-active damper actuator connected between the elevator cable and the elevator car to apply a damping force the elevator cables. Another embodiment uses a semi-active damper actuator connected between the elevator cable and the elevator shaft to apply a damping force the elevator cable.

It is another objective of the embodiments, to provide a method that applies the damping force optimally, e.g., only when necessary, such that maintenance of components of the elevator system can be decreased. For example, one embodiment of the invention updates a damping coefficient of the semi-active damper actuator according to a function of the velocity of the sway. The embodiment reduces a lateral sway of elevator cables by applying time varying damping force to the elevator cables.

Embodiments of the invention are based on a realization that the damping force applied to the elevator cables can be used to stabilize the elevator system. Therefore, the damping force can be analyzed based on stability of the elevator cables using a model of the elevator cables. Various types of stability are used by embodiments for solutions of differential equations describing a dynamical system representing the motion of the elevator cables.

For example, some embodiments require the dynamical system representing the elevator cables to be Lyapunov stable. Specifically, the stabilization of the elevator cables can be described by a control Lyapunov function, wherein the damping force of the elevator cables stabilizing the elevator cables is determined by a control law, such that a derivative of a Lyapunov function along dynamics of the elevator cables controlled by the control law is negative definite.

Accordingly, one embodiment discloses a method for controlling an operation of an elevator system including an elevator car moving within an elevator shaft and at least one elevator cable connected to the elevator car and the elevator shaft. The method includes determining, during the operation of the elevator system, a velocity of a sway of the elevator cable; and modifying, in response to the determining, a damping coefficient of a semi-active damper actuator connected to the elevator cable according to a function of the velocity of the sway. The steps of the method are performed by at least one processor.

Another embodiment discloses an elevator system including an elevator car moving within an elevator shaft; an elevator cable connected to the elevator car and the elevator shaft for supplying power to the elevator car; a semi-active damper actuator connected to the elevator cable and connected to the elevator car or to the elevator shaft; a sway unit for determining a velocity of the sway of the elevator cable; and a control unit including a processor for controlling a damping coefficient of the semi-active damper actuator according to a function of the velocity of the sway of the elevator cable.

Yet another embodiment discloses a non-transitory computer-readable medium with instructions stored thereon, that when executed by a processor, perform steps including determining amplitudes of a sway of the elevator cable during the operation of the elevator system; determining a velocity of the sway based on a numerical differentiation of the amplitudes of the sway; determining a damping coefficient of a semi-active damper actuator according to a function of the velocity of the sway; and generating a command to control the semi-active damper actuator according to the damping coefficient.

DETAILED DESCRIPTION OF THE PREFERRED EMBODIMENT

Vibration reduction in mechanical systems is important for a number of reasons including safety and efficiency of the systems. Particularly, vibration, such as a lateral sway of an elevator cable, such as an electric cable supplying power to the elevator car in the elevator system, is directly related to the elevator system preservation and to the safety of passengers, and, thus, should be reduced.

The vibration induced by, e.g., external disturbance such as wind or seismic activity, can be reduced by various types of control systems. Generally, there are passive, semi-active, and active types of the control systems. The passive control system has undesirable un-adaptive quality in the sense that the chosen value of the damping coefficient is final and cannot be modified after installation, even if it turns out to be infective in all cases of actual disturbances. The active control systems use actuators that can exert an independent force on the vibrating system, and can provide desirable performance for reducing the vibration. The drawbacks of the active control system are increased cost, complication, mass, and maintenance.

The semi-active control systems provide a better trade-off between system cost and performance. For example, a semi-active damper actuator allows for the adjustment of parameters, such as viscous damping coefficient and can be used to reduce the vibration, and is reliable because such actuator only dissipates energy.

Some embodiments of the invention are based on a realization that it can be advantageous to reduce the sway of the elevator cables by applying damping force to the elevator cables using semi-active damper actuators, i.e., the semi-active dampers. Such application of the damping force can change the damping of the elevator cables and reduces their sway. In addition, time-varying selection of the damping coefficient of the semi-active dampers can help to reduce the size of the semi-active dampers as compared with the size of passive dampers resulting in the same or similar performance.

However, the elevator system that is controlled with a passive damper can be modeled as a linear system, while the elevator system having semi-active dampers can be modeled only as non-linear system due to the change of the semi-active damper coefficient as function of the states of the elevator cables, which is more difficult to analyze. Thus, the controlling of the semi-active dampers is more difficult, and incorrect control can increase the sway of the elevator cables.

Various embodiments of the invention are based on a realization that the damping force applied to the elevator cables can be used to stabilize an elevator system. Moreover, the stabilization of the elevator system can be described by a control Lyapunov function, such that the damping force of the elevator cables stabilizing the elevator cables system ensures the negative definiteness of a derivative of the control Lyapunov function. By combining Lyapunov theory and the cables damping actuation, a nonlinear controller, according to some embodiments, reduces the cables sway amplitude. The amplitude of the positive damping to be applied, are obtained based on the Lyapunov theory.

Accordingly, the damping coefficient amplitude decreases as function of the cables sway amplitude. Therefore, in some embodiments, no unnecessary extra damping is applied to parts of the elevator system, such as the elevator cables, which can reduce the cost of the maintenance and the overall energy consumption of the system.

Figure 1A:
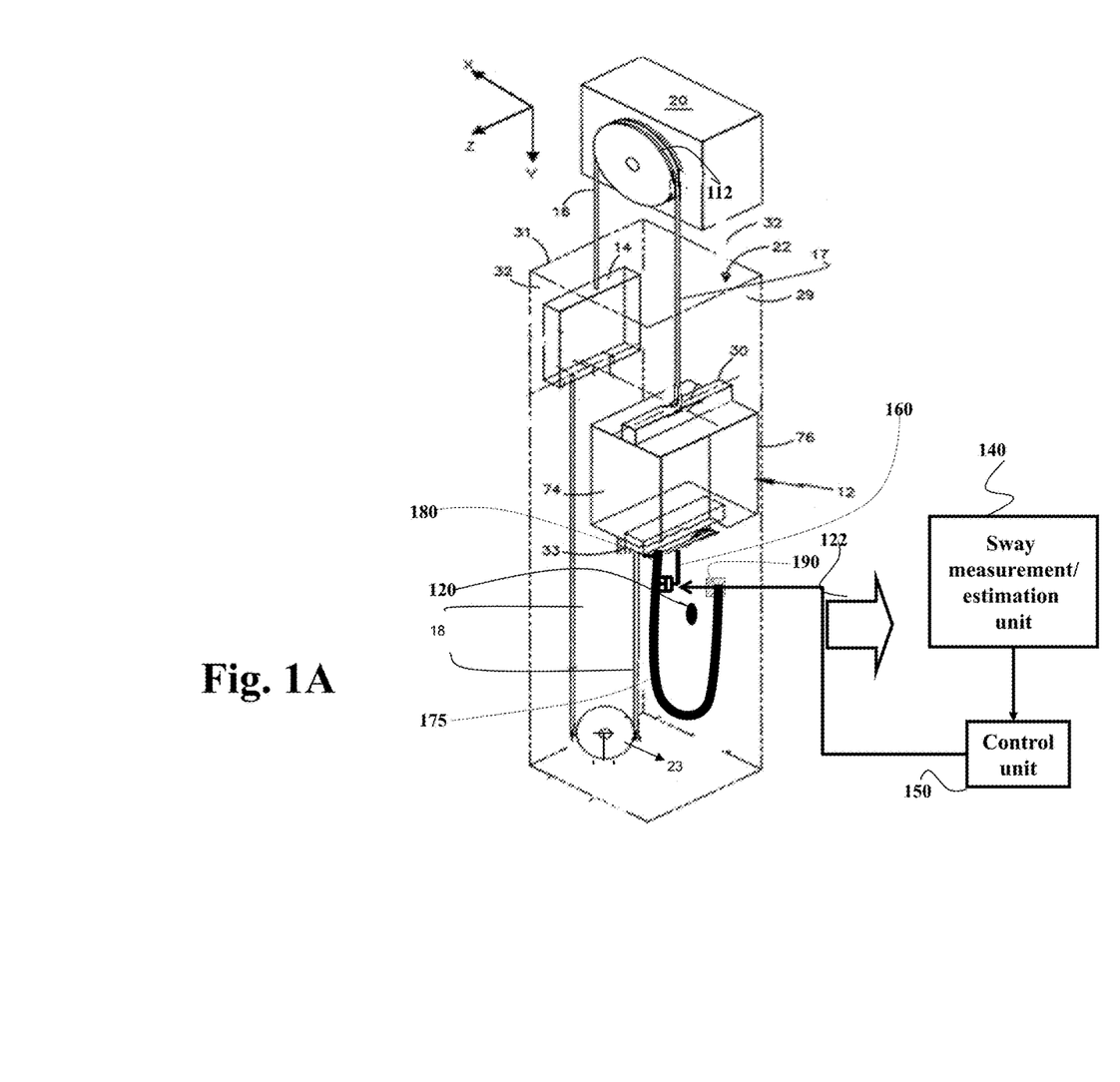
FIGS. 1A to 1C are schematics of elevator systems using various embodiments of an invention.

FIG. 1A shows a schematic of an elevator system according to one embodiment of an invention. The elevator system includes an elevator car 12 connected by at least one elevator cables to different components of the elevator system. For example, the elevator car and a counterweight 14 connect to one another by main cables 16-17, and compensating cables 18. The elevator car 12 can include a crosshead 30 and a safety plank 33. A pulley 20 for moving the elevator car 12 and the counterweight 14 through an elevator shaft 22 can be located in a machine room (not shown) at the top (or bottom) of the elevator shaft 22. The elevator system can also include a compensating pulley 23. An elevator shaft 22 includes a front wall 29, a back wall 31, and a pair of side walls 32. Furthermore, the electrical signals and commands are carried to the elevator car by electrical cables 175, attached between the car 12 and an attachment point on the elevator shaft 190.

The elevator car and the counterweight have a center of gravity at a point where summations of the moments in the x, y, and z directions are zero. In other words, the car 12 or counterweight 14 can theoretically be supported and balanced at the center of gravity (x, y, z), because all of the moments surrounding the center of gravity point are cancel out. The main cables 16-17 typically are connected to the crosshead 30 of the elevator car 12 where the coordinates of the center of gravity of the car are projected. The main cables 16-17 are connected to the top of the counterweight 14 the coordinates of the center of gravity of the counterweight 14 are projected.

During the operation of the elevator system, different components of the system are subjected to internal and external disturbance, e.g., sway due to wind, resulting in lateral motion of the components. Such lateral motion of the components can result in a sway of the elevator electrical cables 175 that needs to be measured. Accordingly, one or a set of sway sensors 120 can be arranged in the elevator system to determine a lateral sway of the elevator cables.

The set of sensors can include at least one sway sensor 120. For example, the sway sensor 120 is configured to sense a lateral sway of the elevator cables at a sway location associated with a position of the sway sensor.

However, in various embodiments, the sensors can be arranged in different positions such that the sway locations are sensed and/or measured. The actual positions of the sensors can depend on the type of the sensors used. For example, the sway sensor can be any motion sensor, e.g., a light beam sensor, or a continuous laser sensor etc.

In one embodiment, a first sway sensor is placed at a neutral position of the cables corresponding to the initial configuration of the cables, i.e., no cables sway. The other sway sensors are arranged away from the neutral position and at the same height as the first sway sensor.

During the operation of the elevator system, the locations of the sway are determined and transmitted 122 to a sway measurement and estimation unit 140. The sway unit 140 determines a state of the sway of the elevator cables, e.g., amplitude and a velocity of the sway. The sway unit can determine the state of the sway based only on the sway measurements.

In the system of FIG. 1A, the cables sway is controlled by a semi-active damper actuator 160 mounted on the bottom of the elevator car 12 and operatively connected to the elevator cables, such that the semi-active damper can apply damping force to the elevator cables. The actuator 160 is controlled by the control unit 150 that calculates the amplitude of the damping coefficient of the semi-active damper to change the damping force applied to the elevator cables.

In the embodiment of FIG. 1A, the semi-active damper applies damping force to the elevator cables from the cables side directly connected to the car. However, in different embodiments, the arrangement of the semi-dampers varies and the damping force is applied to the different parts of the elevator cables FIG. 1B. In addition, in some embodiments, multiple semi-active dampers are used to apply damping force to the elevator cables FIG. 1C.

Figure 1B:
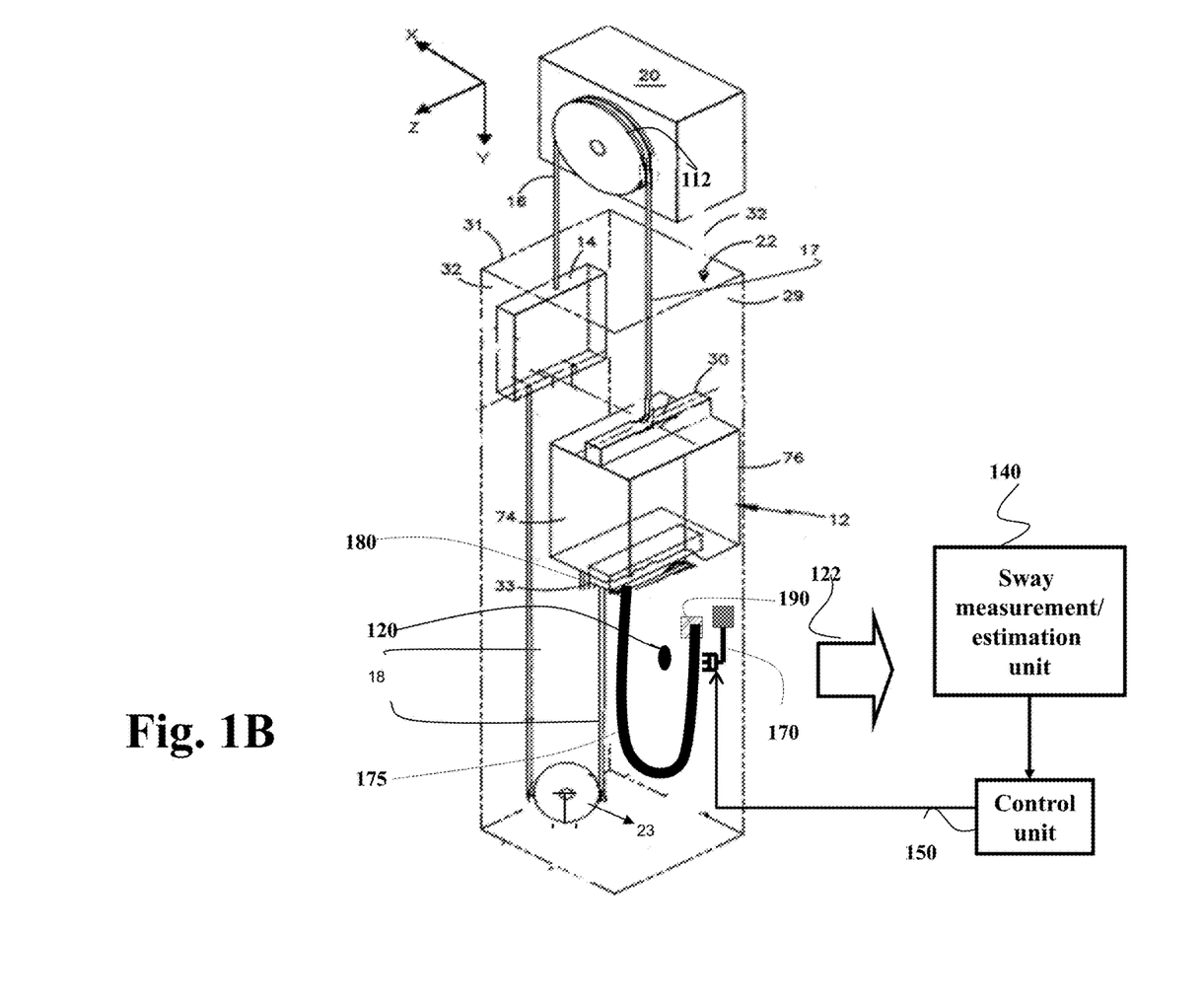

For example, FIG. 1B shows a schematic of the elevator system according to another embodiment. In this embodiment, the cables sway is controlled by a semi-active damper actuator 170 mounted between the elevator cables 175 and point of attachment 190 of the elevator cables and the elevator shaft.

Figure 1C:
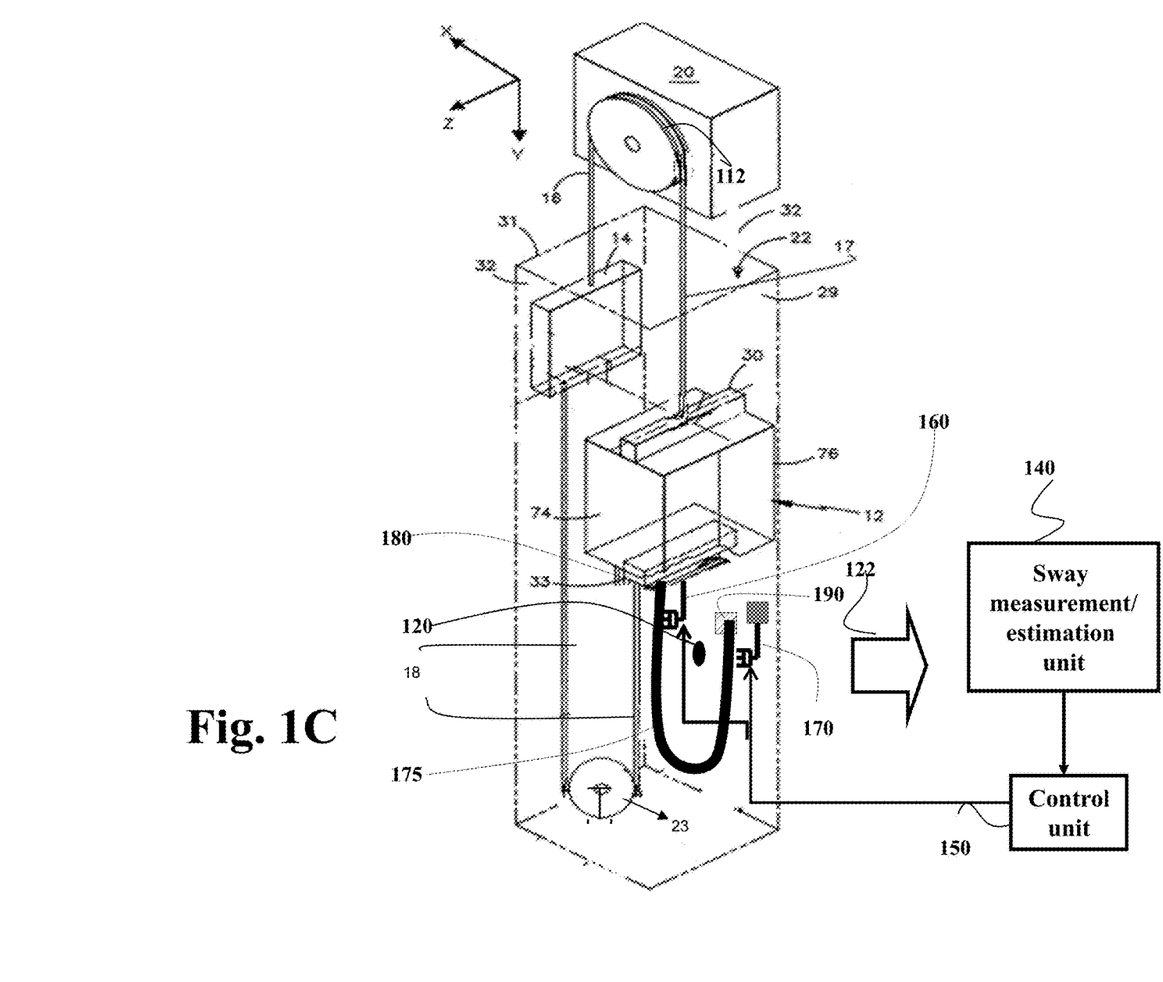

FIG. 1C shows a schematic of the elevator system according to another embodiment. In this embodiment, the cables sway is controlled by two semi-active damper actuators 160, 170 mounted on both sides of the elevator cables.

Figure 1D:
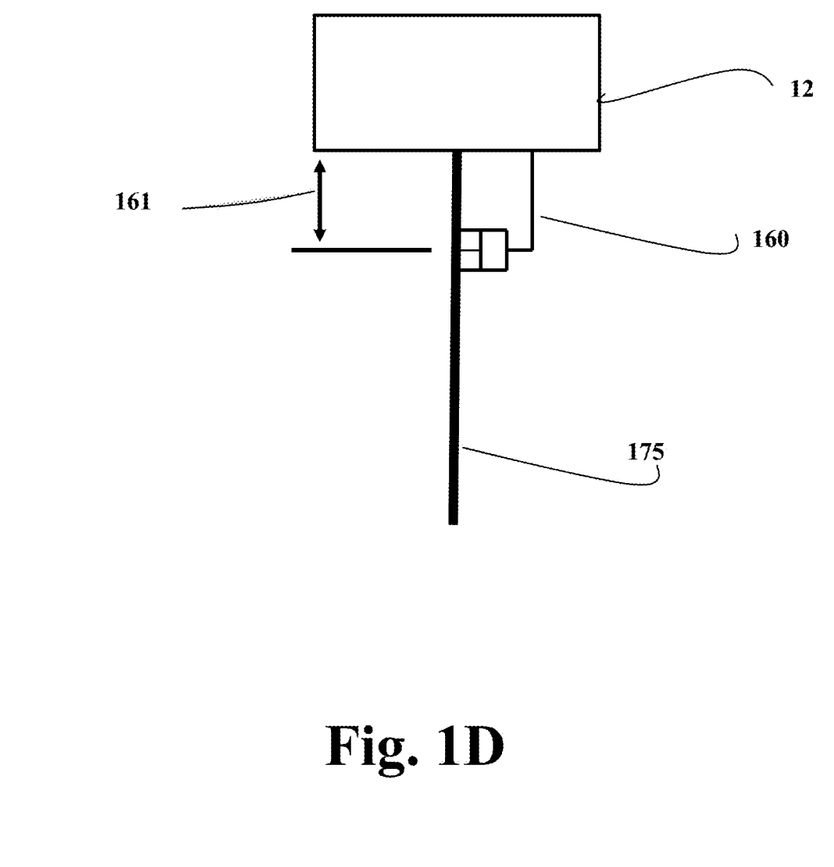
FIGS. 1D and 1E are schematics of arrangements of a semi-active damper actuator according to some embodiments of the invention.

FIG. 1D shows a schematic of arrangement of the semi-active damper actuator 160 according to one embodiment. The semi-active damper 160 is connected to a bottom of the elevator car 12 and to the elevator cables 175 at a distance 161 from the elevator car. The semi-active damper can be affixed or attached movably to the elevator cables. When the elevator cable oscillates, the semi-active damper exerts the damping force in a direction opposite the direction of the motion of the elevator cables and damps the oscillation of the elevator cables.

Figure 1E:
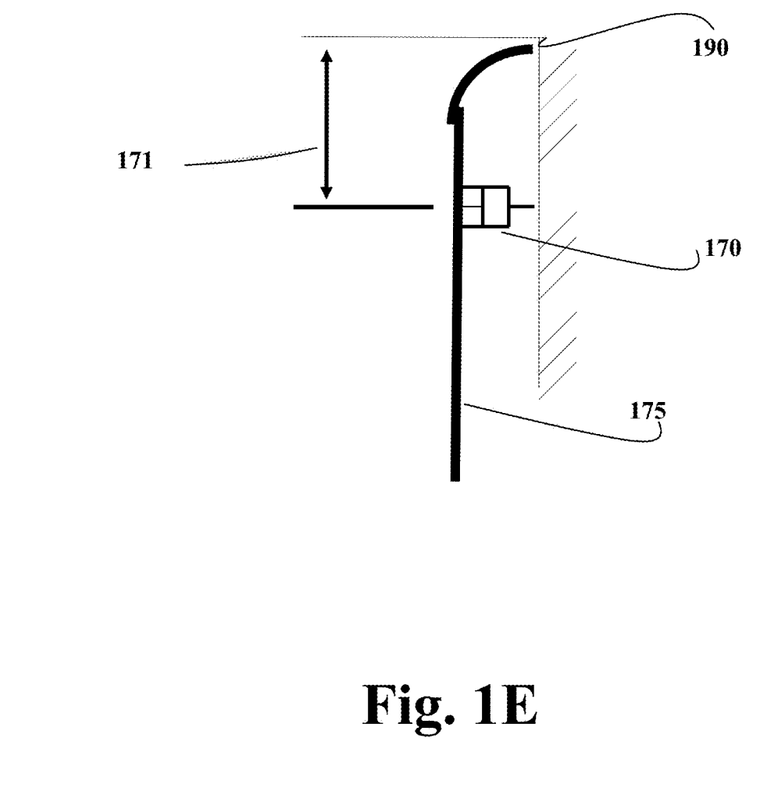

FIG. 1E shows a schematic of arrangement of the semi-active damper actuator 170 according to one embodiment. The semi-active damper 170 is connected to a bottom of the elevator shaft and to the elevator cables 175 at a distance 171 from the point of attachment 190 of the elevator cables and the elevator shaft. The semi-active damper can be affixed or attached movably to the elevator cables. When the elevator cable oscillates, the semi-active damper exerts the damping force in a direction opposite the direction of the motion of the elevator cables and damps the oscillation of the elevator cables.

Control Design

Figure 2:
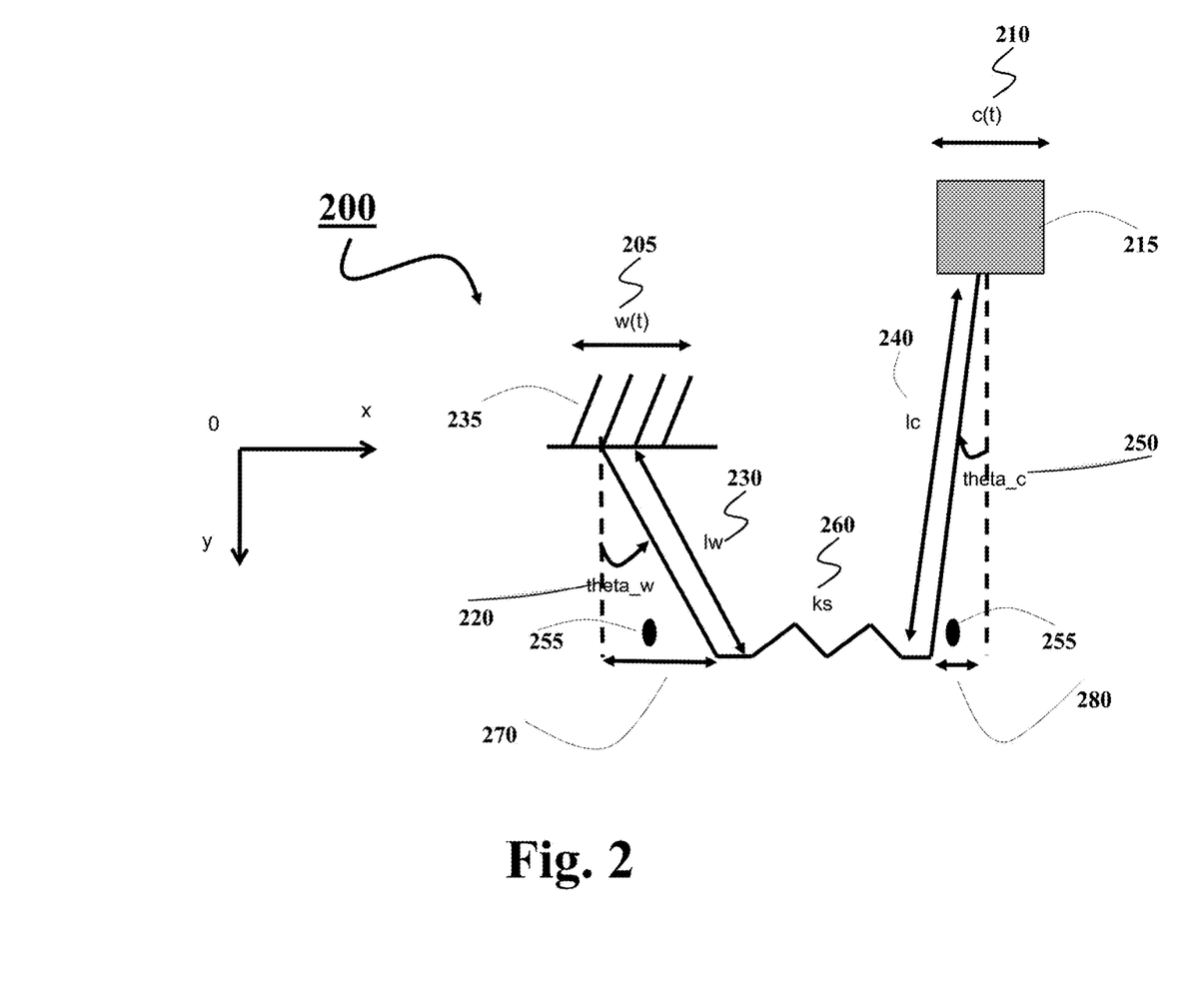
FIG. 2 is a schematic of a model of the elevator system according to one embodiment of the invention.

FIG. 2 shows an example of a model 200 of the elevator cables system designed based on parameters of the elevator cable system. The parameters and the models of other elevator cables system can be similarly derived. Various methods can be used to simulate operation of the elevator cables system according to the model of the elevator cable system, e.g., to simulate an actual sway 270, 280 of the elevator cables caused by operating the elevator system sensed by a sway sensor 255.

Various embodiments can use different models of the elevator cables system to design the control law. For example, one embodiment performs the modeling based on Newton's law. For example, in one embodiment, the elevator cable is modeled as a two rigid segments 230, 240 coupled with a compliant spring 260. One side of the cables is attached to the car 215, and the other side is attached to the elevator shaft 235. The external disturbance on the system, e.g. from wind, is modeled with w(t) 205 at the wall-side and with c(t) 210 at the car-side, the cable sways are directly proportional to the angular variable 250 at the car-side, and the angular variable 220 at the wall-side.

This embodiment is advantageous because of its simplicity and low computations requirements. Indeed, other more complicated models might be developed for this system. For instance, one can develop a lumped model, which discretized the cables to several small spring-damper elements connected to each other to form a cable and then writes the dynamical models for each element. However, this approach leads to a complicated model with large number of variables, which is not suitable for real-time simulations and control. For example, one embodiment designs a model for the elevator cable system by using an infinite dimension model for each cable, which is mathematically presented in the form of a partial differential equation (PDE). However, solving PDE's online is computationally expensive and thus not always suitable for real-time simulation and control applications.

In one embodiment, the model of the elevator cables system controlled with semi-active dampers actuator is determined by an ordinary differential equation (ODE) according to $$m_c l_c^2 \ddot{\theta}_c = -m_c l_c g \sin(\theta_c) - c_c l_c^2 \dot{\theta}_c - c_{cj}\dot{\theta}_c - F_s l_c \cos(\theta_c) - m_c \ddot{c} l_c \cos(\theta_c) - U_c l_{dpc}^2 \dot{\theta}_c$$

$$m_w l_w^2 \ddot{\theta}_w = -m_w l_w g \sin(\theta_w) - c_w l_w \dot{\theta}_w - c_{wj}\dot{\theta}_w - F_s l_w \cos(\theta_w) - m_w \ddot{w} l_w \cos(\theta_w) - U_w l_{dpw}^2 \dot{\theta}_w$$

$$F_s = k_s(l_c \sin(\theta_c) + l_w \sin(\theta_w)).$$

In the above mentioned equation, $m_c$ (kg) is the mass of the car-side segment of the cable, $l_c$ (m) is the length of the car-side segment of the cable, $\theta_c$ (rad) is the angle of the car-side segment of the cable, $\dot{\theta}_c$ (rad/sec) is the angular velocity of the car-side segment of the cable, $\ddot{\theta}_c$ (rad/sec$^2$) is the angular acceleration of the car-side segment of the cable, $c_{cj}$ (N·sec/m) is the linear damping coefficient at the joint level of the car-side segment of the cable, $c_c$ (N·sec/m) is the damping coefficient for laminar flows (air damping coefficient), c(t) (m) is the displacement of the cable at its car boundary, $\ddot{c}$(t) (m/sec$^2$) is the acceleration of the cable at its car boundary, $U_c$ (N·sec/m) is the linear damping coefficient of the damping actuator at the car side, $l_{dpc}$ (m) is the distance between the car boundary of the cable and the point of contact with the damping actuator at the car-side, $k_s$ (N/m) is the spring stiffness coefficient of the coupling spring between the car-side segment of the cable and the wall-side segment of the cable.

Also, $m_w$ (kg) is the mass of the elevator shaft-side segment of the cable, $l_w$ (m) is the length of the elevator shaft-side segment of the cable, $\theta_w$ (rad) is the angle of the elevator shaft-side segment of the cable, $\dot{\theta}_w$ (rad/sec) is the angular velocity of the elevator shaft-side segment of the cable, $\ddot{\theta}_w$ (rad/sec$^2$) is the angular acceleration of the elevator shaft-side segment of the cable, $c_{wj}$ (N·sec/m) is the linear damping coefficient at the joint level of the elevator shaft-side segment of the cable, $c_w$ (N·sec/m) is the damping coefficient for laminar flows (air damping coefficient), w(t) (m) is the displacement of the cable at its elevator shaft boundary, $\ddot{w}$(t)(m/sec$^2$) is the acceleration of the cable at its elevator shaft boundary, $U_w$ (N·sec/m) is the linear damping coefficient of the damping actuator at the elevator shaft-side, $l_{dpw}$ (m) is the distance between the elevator shaft boundary of the cable and the point of contact with the damping actuator at the elevator shaft-side.

The absolute sway of the elevator cable is $$u_w(x,t)=\tan(\theta_w)x+w(t)$$

$$u_c(x,t)=\tan(\theta_c)x+c(t),$$

wherein: $u_w(x,t)$ is the cables sway at the elevator shaft side and $u_c(x,t)$ is the cables sway at the elevator car side.

In the case of small angles approximation, the previous model can be re-organized as follows:

$$M\ddot{X}+(C+\tilde{C}U)\dot{X}+KX=F(t)$$

$$X=(\theta_c,\theta_w)^T,$$

wherein, M is an inertial matrix, (C+) is constructed by combining a natural damping matrix $\check{C}U$ and a semi-active controlled damping matrix, K is a stiffness matrix and F(t) is a vector of external forces.

These matrices are given below:

$$M = \begin{bmatrix} m_w l_w^2 & 0 \\ 0 & m_c l_c^2 \end{bmatrix}$$

$$K = \begin{bmatrix} k_s l_w^2 + m_w l_w g & k_s l_c l_w \\ k_s l_c l_w & k_s l_c^2 + m_c l_c g \end{bmatrix}$$

$$C = \begin{bmatrix} c_c l_c + c_{cj} & 0 \\ 0 & c_w l_w + c_{wj} \end{bmatrix}$$

$$\check{C}U = \begin{bmatrix} U_c l_{dpc}^2 & 0 \\ 0 & U_w l_{dpw}^2 \end{bmatrix}$$

$$F(t) = \begin{bmatrix} -m_c l_c \ddot{c} \\ -m_w l_w \ddot{w} \end{bmatrix}.$$

The system model given above is an example of model of the elevator cables system. Other models based on a different theory, e.g., string or beam theory, can be used by the embodiments of the invention.

Updating Damping Coefficient of Semi-Active Damper Actuator

The damping force generated by the a semi-active damper actuator is related to the velocity v of the sway of the elevator cables by $$F=-cv,$$

where c is the damping coefficient of the semi-active damper actuator, e.g., given in units of Newton-seconds per meter.

Figure 3A:
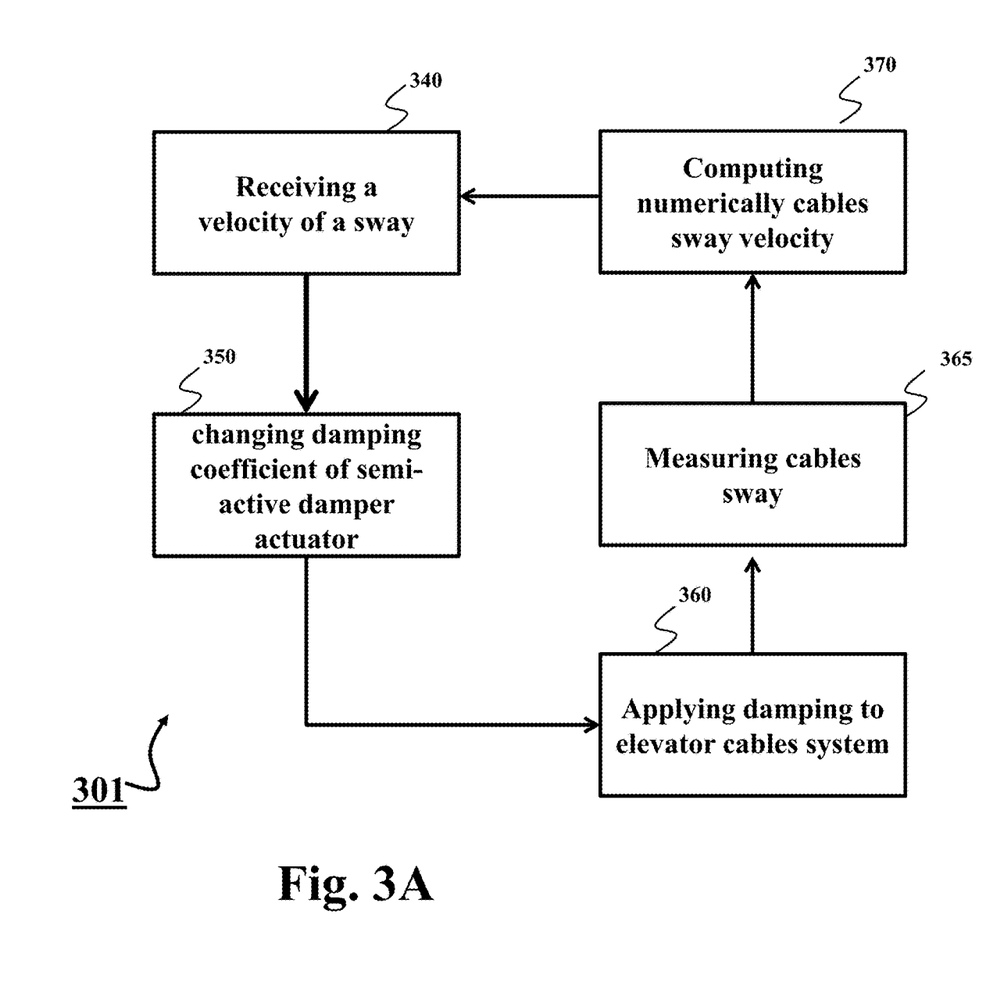
FIG. 3A is a block diagram of a method for controlling an operation of the elevator system by changing a damping coefficient of a semi-active damper actuator according to some embodiments of the invention.

In contrast to the passive damper, some embodiments change the damping coefficient of the semi-active damper actuator during the operation of the actuator. Various embodiments use different types of the semi-active damper actuator, and the mechanism of changing the damping coefficient differs for different semi-active damper actuators FIG. 3A shows a block diagram of a method for controlling an operation of an elevator cables system according to some embodiments of the invention. Various embodiments of the invention change350 and applied 360 a damping coefficient of a semi-active damper actuator connected to the elevator cables in response to the receiving 340 a velocity of a sway of the elevator cables determined 370 during the operation of the elevator cables system from the measurements 365 of the amplitude of a sway of the cables. For example, one embodiment determines a set of values of amplitude of the sway and determines the velocity of the sway based on numerical differentiation of the set of values of the amplitude of the sway. Steps of the method can be performed by at least one processor 301.

Control Law

Some embodiments determine the control law to control the semi-active damper(s) damping coefficient(s). The semi-active damper changes the damping of the elevator cables based on the control law. One embodiment determines the control law for the case of the cables model described above. However, other embodiments similarly determine the control law for any other model of the elevator cables.

Figure 3B:
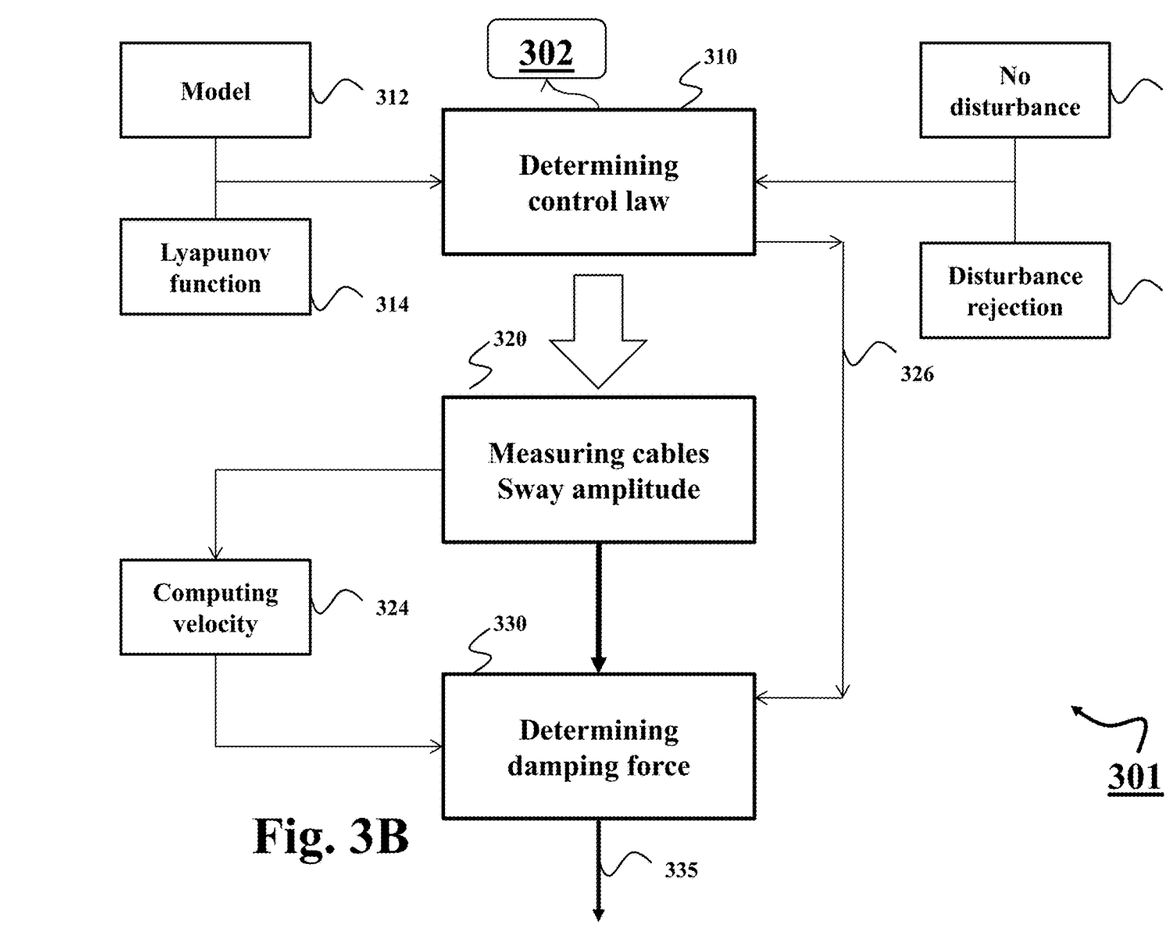
FIG. 3B is a block diagram of a method for controlling the operation of the elevator system according to another embodiment of the invention.

FIG. 3B shows a block diagram of a method for controlling an operation of an elevator cables system. The method can be implemented using a processor 301. The method determines 310 a control law 326 stabilizing a sway of the elevator cables system using a damping force 335 on the elevator cable in the elevator system. The control law is a function of a velocity 324 of the sway of the elevator cables, and determined such that a derivative of a Lyapunov function 314 along dynamics of the elevator cables system controlled by the control law is negative definite. The control law can be stored into a memory 302. The memory 302 can be of any type and can be operatively connected to the processor 301.

The negative definiteness requirement of the Lyapunov function ensures the stabilization of the elevator cables system and reduction of the cables sway. Also, determining the control based on Lyapunov theory allows applying the damping force optimally, i.e., only when necessary to reduce the sway, and thus reduce the maintenance cost of the elevator system and the overall energy consumption.

One embodiment determines the control law 326 based on a model 312 of the elevator system with no disturbance 316. The disturbance include external disturbance such as a force of the wind or seismic activity. This embodiment is advantageous when the external disturbance is small or quickly dissipated. However, such embodiment can be suboptimal when the disturbance is large and steady.

Another embodiment modifies the control law with a disturbance rejection component 318 to force the derivative of the Lyapunov function to be negative definite. This embodiment is advantageous for elevator systems subject to a long term disturbance. In one variation of this embodiment, the external disturbance is measured during the operation of the elevator system. In another embodiment, the disturbance rejection component is determined based on the boundaries of the external disturbance. This embodiment allows for compensating for disturbance without measuring the disturbance.

During the operation of the elevator system, the method determines 320 the velocity 324 of the sway of the elevator cables. For example, the amplitude and the velocity can be directly measured using various samples of the state of the elevator system. Additionally or alternatively, the amplitude and the velocity of the sway can be estimated using, e.g., a model of the elevator cables system and reduce number of samples, or various interpolation techniques. Next, the damping force335 applied to the elevator cables by the semi-active damper actuator, such as actuators 160 and 170, is determined based on the control law 326, and the velocity 324 of the sway of the elevator cables.

Lyapunov Theory-Based Control

Some embodiments use the damping force applied to the cables by the semi-active actuator and the Lyapunov theory to stabilize the elevator cables system, and thus stabilize the cables sway. By combining the Lyapunov theory and the cables damping actuation, the control unit 150, according to some embodiments, reduces the amplitude of the cables sway by using sway dependent nonlinear control amplitude which decreases as function of the cables sway velocity. The amplitude of the positive damping coefficient, i.e. damping force, to be applied is obtained based on the Lyapunov theory.

One embodiment defines a control Lyapunov function $V(x)$ as $$V = \frac{1}{2}\dot{X}^T M \dot{X} + \frac{1}{2} X^T K X,$$

wherein M, K, and X are the mass, stiffness matrices of the cable system and the vector of angular displacements, as defined above.

Some embodiments determine the control law such that a derivative of the Lyapunov function along dynamics of the elevator cables system controlled by the control law is negative definite. One embodiment determines the derivative of the Lyapunov function along the dynamics of the elevator cables system without disturbances, i.e. $F(t)=0$, for all t, according to $$\dot{V} = -\dot{X}^T(C+\tilde{C}U)\dot{X},$$

$$\dot{V} = -\dot{\theta}_c^2 U_c l_{dpc}^2 - \dot{\theta}_w^2 U_w l_{dpw}^2,$$

wherein the coefficients $\theta_c$, $\theta_w$, $U_c$, $U_w$, $l_{dpc}$, $l_{dpw}$ are as defined in the elevator cables systems presented above.

To ensure the negative definiteness of the derivative V, the control law according to one embodiment changes the damping coefficient of the semi-active damper actuator according to $$U_c = k_c \frac{\dot{\theta}_c^2 l_{dpc}^2}{\sqrt{1+\dot{\theta}_c^2 l_{dpc}^2}}, k_c > 0,$$

$$U_w = k_w \frac{\dot{\theta}_w^2 l_{dpw}^2}{\sqrt{1+\dot{\theta}_w^2 l_{dpw}^2}}, k_w > 0,$$

wherein $k_c$, $k_w$ are positive tuning gains.

This control law is a nonlinear function of the cables angular velocity, which means its amplitude decreases as function of the cables sway velocities. Furthermore the maximum value of the control law, which means the maximum value of the semi-active damping coefficients are fixed by the positive constants $k_c$, $k_w$. A controller according to the previous control law stabilizes the elevator cables system with no disturbance by varying the damping coefficient of the semi-active dampers 160, 170 as a nonlinear function of the cables angular velocities. This controller is easy to implement and is advantageous when the disturbance is unknown or minimal.

Control Under Disturbance

The previous controllers stabilizes the elevator cables system when the disturbance $F(t)=0$, but when the disturbance $F(t)$ is not zero, the Lyapunov function derivative is no longer forced to be zero all the time, because the derivative $\dot{V}$ is $$\dot{V} = -\dot{X}^T(C+\tilde{C}U)\dot{X} + \dot{X}^T F(t),$$

where the terms C, $\tilde{C}U$, F are as defined in the model of the elevator cables system.

Due to the disturbance, the global exponential stability of the closed-loop dynamics of the elevator system can fail. However, some embodiments are based on a realization that a state vector is bounded for bounded disturbance $F(t)$. Thus, the control law for the elevator cables system without the external disturbance 316 can be modified with a disturbance rejection component 318 to ensure that the derivative of the Lyapunov function is negative definite. Moreover, the disturbance rejection component can be determined based on boundaries of the external disturbance $F(t)$. This embodiment is advantageous when the direct measurement of the disturbance is not desirable.

Some embodiments determine a disturbance rejection control using Lyapunov techniques. In this case the Lyapunov derivative is $$\dot{V} \le -\dot{\theta}_c^2 U_c l_{dpc}^2 - \dot{\theta}_w^2 U_w l_{dpw}^2 - m_c l_c \ddot{c} \dot{\theta}_c - m_w l_w \ddot{w} \dot{\theta}_w.$$

Some embodiments select $U_c$, $U_w$ such that $\dot{V}(x)$ is negative definite. For example, one embodiment selects $U_c$, $U_w$ satisfying $$U_c = k_c \frac{\dot{\theta}_c^2 l_{dpc}^2 T_1}{\sqrt{1+\dot{\theta}_c^2 l_{dpc}^2 T_1}}, T_1 = m_c l_c |\ddot{c}|_{max} |\dot{\theta}_c|, k_c > 0$$

$$U_w = k_w \frac{\dot{\theta}_w^2 l_{dpw}^2 T_2}{\sqrt{1+\dot{\theta}_w^2 l_{dpw}^2 T_2}}, T_2 = m_w l_w |\ddot{w}|_{max} |\dot{\theta}_w|, k_w > 0$$

wherein the terms $T_1$, $T_2$ have been added to the original control law to take account of the disturbances term $-m_c l_c \ddot{c} \dot{\theta}_c - m_w l_w \ddot{w} \dot{\theta}_w$ in the expression of $\dot{V}(x)$.

In this case, the expressions of the damping coefficients are proportional to the square of the sway angles, as in the previous case (without external disturbances), moreover, in this case, the control laws include extra terms $T_1$, $T_2$ in each equation. In these terms we see that the effect of the external disturbances accelerations $\ddot{c}$, $\ddot{w}$ is taken into account by writing the terms $T_1$, $T_2$ proportional to a maximal acceleration of the external disturbance $|\ddot{c}|_{max}$, $|\ddot{w}|_{max}$.

The above-described embodiments can be implemented in any of numerous ways. For example, the embodiments may be implemented using hardware, software or a combination thereof. When implemented in software, the software code can be stored on a non-transient computer readable memory and executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for controlling an operation of an elevator system including an elevator car moving within an elevator shaft and at least one elevator cable connected to the elevator car and the elevator shaft, comprising:
determining, during the operation of the elevator system, a velocity of a sway of the elevator cable; and
modifying, in response to the determining, a damping coefficient of a semi-active damper actuator connected to the elevator cable according to a function of the velocity of the sway, wherein steps of the method are performed by at least one processor.

2. The method of claim 1, further comprising:
determining amplitudes of the sway during the operation of the elevator system; and
determining the velocity of the sway based on a numerical differentiation of the amplitudes of the sway.

3. The method of claim 1, further comprising:
determining a control law stabilizing a state of the elevator system, wherein the control law determines a value of the damping coefficient based on the function, such that the value of the damping coefficient ensures a negative definiteness of a derivative of a control Lyapunov function.

4. The method of claim 3, wherein the control law for the elevator system is determined based on a model of the elevator cable within the elevator system, wherein the elevator cable is modeled as a first rigid segment coupled to a second rigid segment via a compliant spring, wherein the first rigid segment is attached to the elevator car, and the second rigid segment is attached to a wall of the elevator shaft.

5. The method of claim 3, wherein the control law is determined such that the value of the damping coefficient of the semi-active damper actuator is proportional to the velocity of the elevator cable.

6. The method of claim 3, wherein the control law is determined such that the value of the damping coefficient of the semi-active damper actuator is proportional to a squared velocity of the elevator cable and bounded by a positive gain.

7. The method of claim 6, wherein the semi-active damper actuator is connected to the elevator car, and wherein the control law is $$U_c = k_c \frac{\dot{\theta}_c^2 l_{dpc}^2}{\sqrt{1 + \dot{\theta}_c^2 l_{dpc}^2}}, k_c > 0,$$

wherein $U_c$ is a value of the damping coefficient, $\dot{\theta}_c$ is the velocity of the angular variable at the car-side, $l_{dpc}$ is a distance along the elevator cable between the elevator car and the semi-active damper actuator, and $k_c$ is the positive gain.

8. The method of claim 6, wherein the semi-active damper actuator is connected to a wall of the elevator shaft, and wherein the control law is $$U_w = k_w \frac{\dot{\theta}_w^2 l_{dpw}^2}{\sqrt{1 + \dot{\theta}_w^2 l_{dpw}^2}}, k_w > 0,$$

wherein $U_w$ is a value of the damping coefficient, $\dot{\theta}_w$ is the velocity of the angular variable at the wall-side, $l_{dpw}$ is a distance along the elevator cable between the wall of the elevator shaft and the semi-active damper actuator, and $k_w$ is the positive gain.

9. The method of claim 6, wherein the control law includes a disturbance rejection component to force the derivative of the Lyapunov function to be negative definite in a presence of an external disturbance, wherein the disturbance rejection component includes a term proportional to a maximal acceleration of the external disturbance.

10. The method of claim 9, wherein the semi-active damper actuator is connected to the elevator car, and wherein the control law is $$U_c = k_c \frac{\dot{\theta}_c^2 l_{dpc}^2 T_1}{\sqrt{1 + \dot{\theta}_c^2 l_{dpc}^2 T_1}}, T_1 = m_c l_c |\ddot{c}|_{max} |\dot{\theta}_c|, k_c > 0,$$

wherein $U_c$ is a value of the damping coefficient, $\dot{\theta}_c$ is the velocity including a velocity of the angular variable at the car-side, $l_{dpc}$ is a distance along the elevator cable between the elevator car and the semi-active damper actuator, and kc is the positive gain, $|\ddot{c}|_{max}$ is the maximum of the external disturbance acceleration at the car-side.

11. The method of claim 9, wherein the semi-active damper actuator is connected to a wall of the elevator shaft, and wherein the control law is $$U_w = k_w \frac{\dot{\theta}_w^2 l_{dpw}^2 T_2}{\sqrt{1 + \dot{\theta}_w^2 l_{dpw}^2 T_2}}, T_2 = m_w l_w |\ddot{w}|_{max} |\dot{\theta}_w|, k_w > 0,$$

wherein $U_w$ is a value of the damping coefficient, $\dot{\theta}_w$ is the velocity including a velocity of the angular variable at the wall-side, $l_{dpw}$ is a distance along the elevator cable between the wall of the elevator shaft and the semi-active damper actuator, and $k_w$ is the positive gain, $|\ddot{w}|_{max}$ is the maximum of the external disturbance acceleration at the elevator shaft wall-side.

12. The method of claim 1, wherein the elevator cable is an electric cable supplying power to the elevator car.

13. The method of claim 1, wherein the semi-active damper actuator is placed between a bottom of the elevator car and the elevator cable, or between the elevator cable and a wall of the elevator shaft.

14. The method of claim 13, wherein the elevator system includes two semi-active damper actuators connecting the elevator cable with the elevator car and with the wall of the elevator shaft.

15. An elevator system, comprising:
an elevator car moving within an elevator shaft;
an elevator cable connected to the elevator car and the elevator shaft for supplying power to the elevator car;
a semi-active damper actuator connected to the elevator cable and connected to the elevator car or to the elevator shaft;
a sway unit for determining a velocity of the sway of the elevator cable; and
a control unit including a processor for controlling a damping coefficient of the semi-active damper actuator according to a function of the velocity of the sway of the elevator cable.

16. The elevator system of claim 15, wherein the sway unit determines a set of values of amplitude of the sway during an operation of the elevator system, and determines the velocity of the sway based on numerical differentiation of the set of values of the amplitude of the sway.

17. The elevator system of claim 15, wherein the control unit controls the damping coefficient according to a control law stabilizing a state of the elevator system, wherein the control law determines a value of the damping coefficient based on the function, such that the value of the damping coefficient ensures a negative definiteness of a derivative of a control Lyapunov function.

18. A non-transitory computer-readable medium with instructions stored thereon, that when executed by a processor, perform steps comprising:
determining amplitudes of a sway of the elevator cable during the operation of the elevator system;
determining a velocity of the sway based on a numerical differentiation of the amplitudes of the sway;
determining a damping coefficient of a semi-active damper actuator according to a function of the velocity of the sway; and
generating a command to control the semi-active damper actuator according to the damping coefficient.

* * * * *